United States Patent [19]

Lanham, Jr. et al.

[11] Patent Number: 4,608,961
[45] Date of Patent: Sep. 2, 1986

[54] EXHAUST DAMPER CONTROL

[75] Inventors: William E. Lanham, Jr., Decatur; Stephen R. Smith, Tucker, both of Ga.

[73] Assignee: Lanham Machinery Company, Inc.

[21] Appl. No.: 605,605

[22] Filed: Apr. 30, 1984

[51] Int. Cl.⁴ .............................. A21B 1/00; F23L 3/00
[52] U.S. Cl. ................................ 126/21 A; 126/285 B; 126/290; 99/331; 99/333; 99/337
[58] Field of Search ............... 126/21 A, 285 B, 290, 126/285 R; 236/15 C, 49, 1 B; 431/20; 99/331, 337, 333

[56] References Cited

U.S. PATENT DOCUMENTS

| | | |
|---|---|---|
| 2,999,450 | 9/1961 | Jackson .................................. 99/331 |
| 3,266,409 | 8/1966 | Oyler ..................................... 99/331 |
| 3,589,307 | 6/1971 | Lanham et al. . | 
| 3,721,177 | 3/1973 | Booker ................................... 99/331 |
| 3,850,086 | 11/1974 | Walters et al. ............... 126/285 B X |
| 4,418,615 | 12/1983 | Higgins ........................ 126/21 A X |
| 4,428,529 | 1/1984 | Bentsen ................................. 236/49 |

FOREIGN PATENT DOCUMENTS 2642127 3/1978 Fed. Rep. of Germany ...... 126/117

*Primary Examiner*—Larry Jones
*Attorney, Agent, or Firm*—Pasquale A. Razzano

[57] ABSTRACT

A damper control is employed in the exhaust duct of a bakery oven to maintain constant air mass flow through the duct during a baking cycle to ensure even baking conditions. The damper control can include a pitot tube from which velocity pressure can be derived, and a pneumatic or electronic control loop to move an exhaust damper in the exhaust duct as necessary to keep the velocity pressure constant.

9 Claims, 3 Drawing Figures

EXHAUST DAMPER CONTROL

This invention relates to ovens or similar heating devices in which an exhaust is to be regulated. In particular, the invention is directed to ovens for bakery products which are continuously conveyed through the oven. More specifically, the invention relates to such a baking oven in which there are provided means for controlling the mass flow rate of air through an oven exhaust duct, so that the oven conditions are maintained substantially constant despite any ambient temperature or pressure changes.

Present automatic baking ovens, of the type which might be found in a bakery plant, generally have an insulated oven enclosure, a conveyor system for carrying bakery goods into an oven space in the oven enclosure, burners or heaters within the oven enclosure for heating the air therein, and an exhaust duct in communication with the air near the roof of the oven enclosure. Generally, the exhaust duct has a blower or fan associated with it for forcing a draft out the exhaust duct to an exhaust stack so that the oven exhaust gases are blown to the atmosphere outside the plant. In order to ensure even quality of the baked products throughout a product run, it is important that the oven gases be vented out at a steady rate throughout the product run. It is also important that the flow rate through the exhaust duct be maintained constant from one run to the next, so that the baked goods from various product runs have the same even quality.

The need for carefully controlled heating conditions in a baking oven to obtain uniformly baked products is described in U.S. Pat. No. 3,589,307 of June 9, 1971. That patent addresses the problem of providing uniform heating conditions throughout a baking oven, where a spiral conveyor carries the bakery products continuously through the oven in a baking cycle. An improved version of this is discussed in copending U.S. patent application Ser. No. 559,892, filed Dec. 9, 1983, and having a common assignee herewith. The disclosures of that patent and of that patent application are incorporated herein by reference.

In addition to the need for uniformity within the oven's baking space, uniformity of conditions over time is also important, so that the product quality can be maintained over time, and products baked early in the day or late in the day are of the same high quality, as are products baked on different days. This uniformity is necessary to ensure that the beginning and end of each product run have the same pleasing brown color and the same uniform texture and moistness.

However, it is difficult for a bakery oven to maintain ideal baking conditions because the volume air flow and mass air flow through the exhaust duct vary during the day. The exhaust air flow also varies from one day to another. For example, during the summer, windows in the bakery plant are kept open and ventilation fans are kept running. As a result, air is brought into the room in which the oven is located, and there is a tendency for the exhaust fan to force more air out the exhaust stack. On the other hand, during the winter months the windows are closed limiting the air availability within the oven room. As a result of this, there is a tendency for less air to be moved out the exhaust duct into the exhaust stack. Further, a storm or high wind can affect the stack draw itself. Small changes in pressure, on the order of a few tenths of an inch of water, can have noticable effects on the quality of the baked goods. Consequently, it is important to maintain the exhaust stack draw as constant as possible despite any changes in atmospheric or ambient conditions.

Because a skilled worker is not always available to set the exhaust damper, this must sometimes be done by an unskilled worker, which can result in setting errors. To avoid this problem, the control of the exhaust damper should be carried out automatically.

While it would seem possible to control the oven exhaust fan speed, such control does not permit adequate compensation for changes in ambient conditions. This is because the fan or blower is a volume air mover. However, as the ambient pressure changes, or as the oven air temperature changes, the same mass of air occupies a different relative volume. As a result, merely controlling the blower speed does not ensure that the same mass rate of air flow out the exhaust stack will be adequately controlled. Consequently, additional means must be included to ensure an even air mass flow out the exhaust stack despite changing meteorological conditions or changes in the air pressure or temperature in the bakery or outside.

Accordingly, it is an object of this invention to provide control means for the exhaust duct of the baking oven which overcomes the above-mentioned problems of the prior art.

It is a further object of this invention to provide a damper control in which the air mass flow rate of the exhaust duct is automatically controlled.

It is a more specific object of this invention to provide a baking oven having an exhaust duct in which a damper or like control device is automatically moved to control the air flow therepast in response to the output of a sensor located downstream of the damper or like device.

In accordance with any of several preferred embodiments of this invention, an improvement is provided in a baking oven of the type in which an oven enclosure, having sides and a roof, defines a baking space within which bakery goods are conveyed to be baked therein. An air exhaust duct has a mouth in communication with the baking space for conveying exhaust air from near the roof of the oven enclosure to an exhaust stack. In the improvement of this invention, the exhaust duct includes exhaust air regulating means for ensuring a constant mass flow rate of the exhaust air through the exhaust duct. In particular embodiments of this invention, the exhaust duct includes a fan for forcing the draft through the duct, and the exhaust air regulating means is operatively disposed between the mouth of the duct and the fan. The exhaust air regulating means can include an exhaust damper within the duct and movable to open and close to regulate air flow in the duct, and a mass flow rate sensor, such as a pitot tube, disposed downstream of the exhaust damper in the duct and providing a signal representative of the air mass flow rate. Where the pitot tube is employed, an absolute pressure output and a velocity pressure output are provided, the latter being the sum of the absolute pressure and the pressure due to the mass flow rate. The differential pressure as between these two outputs then represents the mass flow rate. Damper control means responsive to the signal of the mass flow rate sensing means are coupled by a control linkage to the damper for controlling the movement of the damper in accordance with the air mass flow rate sensed by the pitot tube or similar sensing device. The damper control means can be pneumatically operated or electrically operated.

The damper control means can also include a device to interrupt the damper control means operation during start-up or during a purge cycle.

The foregoing and many other objects, features and advantages of this invention will be more fully understood from the ensuing detailed description of a preferred embodiment, when considered in connection with the accompanying drawings, in which.

Figure 1:
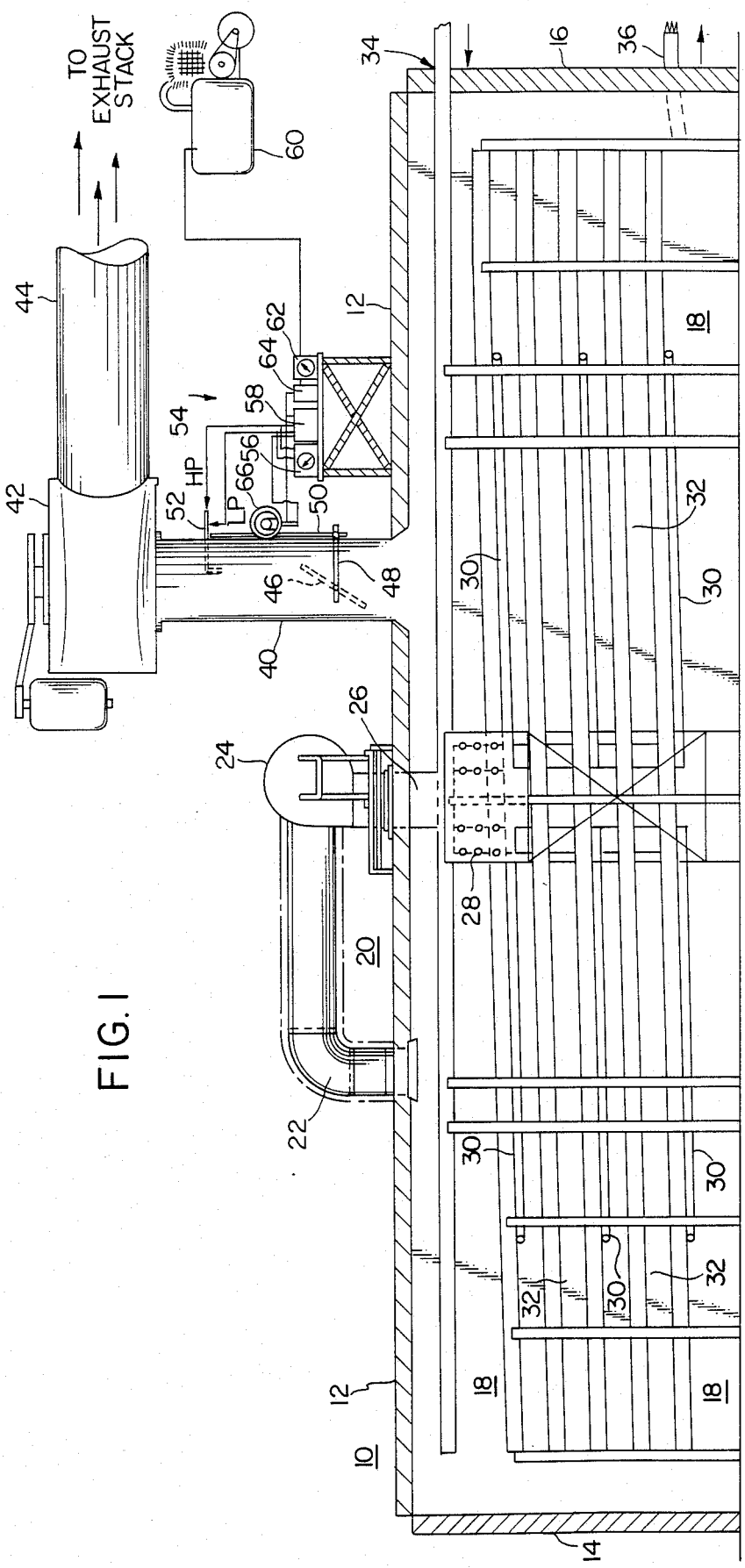
FIG. 1 is a sectional elevation of a baking oven constructed according to one embodiment of this invention.

With reference to the drawings, and initially to FIG. 1 thereof, an oven enclosure 10, shown here in cross-section, is formed of an insulated roof 12 and insulated sides 14 and 16, the oven enclosure 10 defining within it a baking space. Within the enclosure 10 is a tiered conveyor system, of the type which is described, for example, in copending patent application Ser. No. 559,892. An air recycling and redistribution system 20, also described in more detail in copending patent application Ser. No. 559,892, has a recycle exhaust duct 20 whose mouth is in communication with the roof 12 of the oven, and which leads to a blower 24, the latter exhausting into a duct 26 passing through the roof 12 of the oven into a plenum disposed centrally near the oven roof 12. A plurality of distribution pipes 30 lead from the plenum 28 for distributing the recycled heated air beneath alternate tiers of the conveyor system 18.

Also shown in FIG. 1 are gas heater pipes 32 which are disposed beneath the remaining tiers of the conveyor system 18. In the operation of this oven, which is described in more detail in the copending application Ser. No. 559,892, baked goods are continuously conveyed into the oven enclosure 10 through a conveyor inlet port 34, and thence along the successive tiers of the conveyor system 18. The goods are baked as they progress along the system 18 and the baked goods exit the oven enclosure 10 through a conveyor outlet port 36.

An exhaust duct 40 has a mouth at its lower end disposed in communication with the heated gases at the roof 12. The exhaust duct 40 can be of ten-inch diameter tubing for a small oven, fourteen-inch diameter tubing for a medium sized bakery oven, or eighteen-inch diameter tubing for a large oven.

The duct 40 rises to a centrifugal fan or blower 42 having an axial inlet coupled to the top end of the duct 40 and a radial outlet connected to a horizontally-disposed outlet conduit 44. The latter connects to an exhaust stack (not shown) for venting the oven gases to the atmosphere. The exhaust stack can include scrubbers or exhaust gas cleaning equipment, if required by law or regulation.

Figure 2:
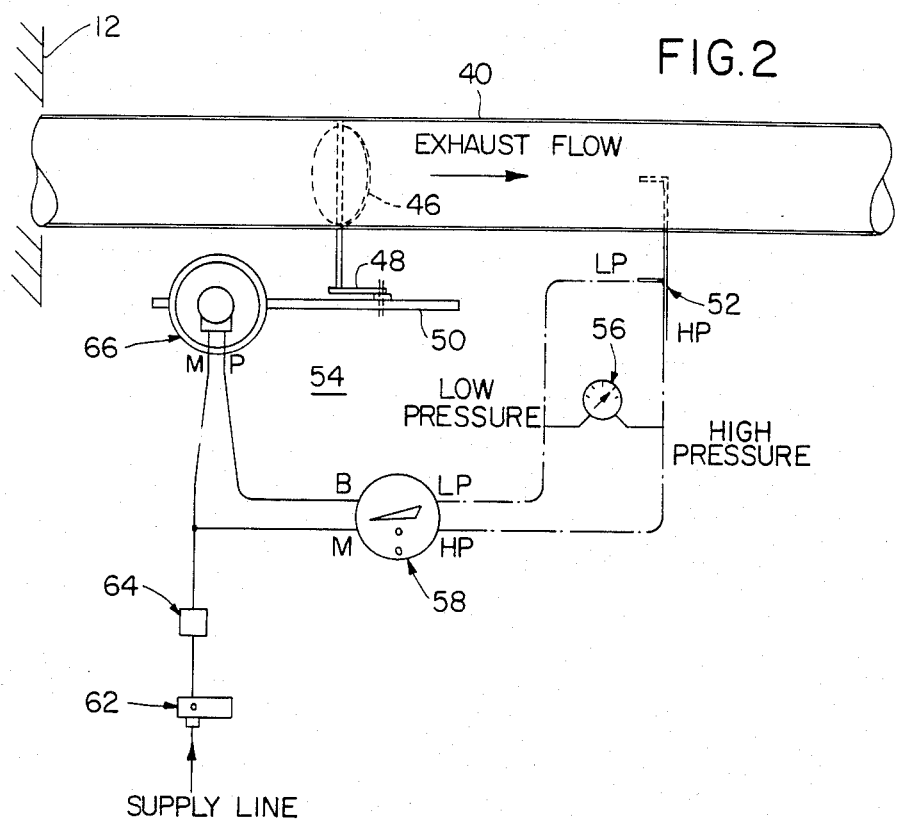
FIG. 2 is a schematic diagram of a portion of the embodiment of FIG. 1.

As is shown environmentally in FIG. 1 and schematically in FIG. 2, an exhaust damper 46 is disposed across the duct 40 between the oven roof 12 and the blower 42. In this embodiment the damper 46 is shown to be a circular plate pivotally mounted in the duct 40 across its diameter. However, many equivalent dampers of other construction exist, and could be adapted for use to control the air flow through the duct 40. The damper 46 is coupled to a crank 48 disposed outside the duct 40, the latter being connected to a control shaft 50. Movement of the control shaft 50 turns the crank 48 to rotate the damper 46 to a selected position between a fully open and fully closed position thereof.

A pitot tube 52 is located downstream from the damper 46 between the latter and the blower 42. The pitot tube 52 is located a sufficient distance downstream of the damper 46 to escape any turbulence in the air flowing past the damper. The pitot tube 52 has a low pressure output LP and a high pressure output HP. The former output LP provides the equivalent "static" pressure, or absolute pressure in the duct 40, while the latter output HP provides the pressure corresponding to the absolute pressure plus the velocity pressure. The differential pressure $\Delta P$ between these pressures then is just the velocity pressure, which is proportional to the rate of air mass flow past the pitot tube 52.

A control system 54, together with the exhaust damper 46, the pitot tube 52, and the exhaust flow in the duct 40, forms a closed control loop or servo loop. In the control system 54, a differential pressure gauge 56 has inlets coupled to the outlets HP and LP of the pitot tube 52, and indicates the velocity pressure sensed by the pitot tube 52. The reading on the gauge 54 is proportional to, and thus provides an indication of, the mass flow rate of the exhaust air. The outputs HP and LP are also coupled to respective control inputs of a static pressure regulator 58. This device can favorably be a Honeywell Model PP 904A1001 unit, having working parameters of 0.01 inch to 0.06 inch w.c. set, and 0.02 inch to 0.5 inch w.c. throttle. This static pressure regulator 58 acts as a balance circuit and controls the pressure of air at its output B when controlling air is supplied to its modulating supply inlet M.

An air supply 60 (shown in FIG. 1 as a compressor) supplies control air, in this embodiment, at a nominal pressure of 15 psig. The control air is supplied through a pressure regulator unit 62 with built-in gauge. This can be, for example, a Honeywell Model 358245-5 Regulator Unit. Regulated control air is furnished therefrom through a solenoid valve 64 to the modulating input M of the static pressure regulator 58 and to a modulating input M of an air motor 66. A control air line connects the output B of the static pressure regulator 58 to a pressure inlet P of the air motor 66 to supply controlling reference pressure, proportional to the air mass flow rate detected by the pitot tube 52, to the motor 66. The air motor 66 can be any conventional device, such as a diaphragm operator where the control air operates against a three-to-fifteen psi spring pressure. A suitable air motor is the Honeywell Model 03#686886-025. The elements 56, 58, 64, and 62 of the control system 54 can all be favorably mounted, for example, on a bench secured to the oven roof 12, as illustrated in FIG. 1. If more convenient, these elements can be disposed remotely.

The solenoid valve 64 is normally open during an operating cycle of the oven 10 to permit pneumatic operation of the control system 54. However, during start-up or during a purge cycle, where the damper 46 must be kept open, the solenoid valve cuts off the control air from the supply 60. The spring of the air motor 66 causes the crank 48 to turn in the direction to fully open the damper 46. However, once a steady state baking operation commences, the solenoid valve 64 opens to permit air flow to the pneumatically operated control system 54, and the damper 46 is automatically controlled to achieve a constant air mass flow through the exhaust duct 40.

Figure 3:
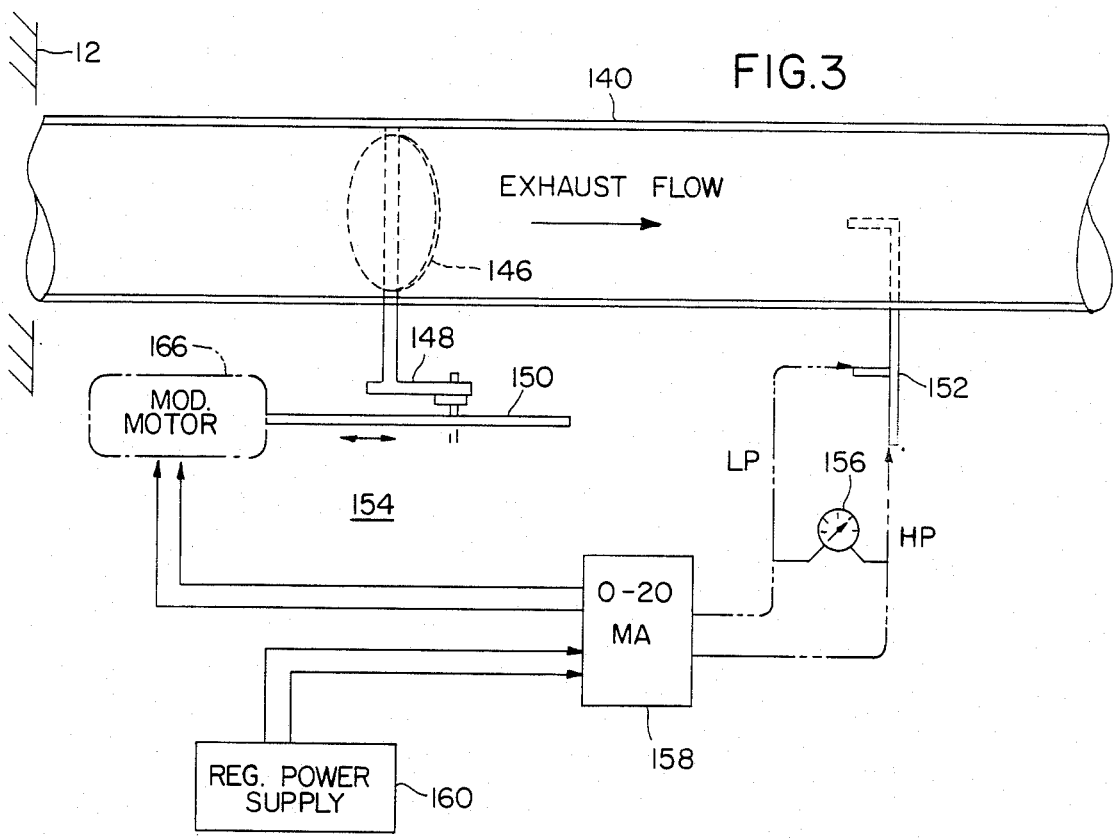
FIG. 3 is a schematic illustration of a portion of an alternative embodiment of this invention.

The invention is not limited to pneumatic devices, and an electrically operated system could also be employed, such as that shown in the embodiment illustrated in FIG. 3. In FIG. 3, elements corresponding to elements in FIG. 2 are identified with the same reference numbers, but raised by 100.

In this alternative embodiment, the pitot tube 152 is coupled, in addition to the gauge 156, to differential pressure inputs of a 0–20 ma modulating circuit 158. This circuit has power inputs coupled to a regulated power supply 160, and has outputs which provide a current signal proportional to the pressure difference between the outputs HP and LP of the pitot tube 152. These outputs are coupled to a modulating motor 166 which changes its position in accordance with a 0 to 20 ma current signal provided from the modulating circuit 158. In this case, when the velocity pressure as sensed by the pitot tube 152 changes, the current supplied from the circuit 158 changes correspondingly, which changes the position of the modulating motor 166. This in turn moves the control shaft 150 and the crank 148 to rotate the damper 146 in the sense to compensate for the detected change in the exhaust air mass flow rate in the exhaust duct 140.

A purge cycle cut off switch is not specifically shown for this embodiment, but would be included, for example, within the power supply 160.

With either the pneumatic control circuit 54 or the electric control circuit 154, there is an automatic control of the exhaust air mass flow in the ducts 40 or 140 based on the velocity pressure detected by the pitot tube 52 or 152. The system including the pitot tube 52 or 152, the damper 46 or 146, and the pneumatic or electric control system 54 or 154 is self-adjusting. Thus, with the embodiments of this invention, even and constant oven conditions are achieved despite any meteorological changes or changes in temperature or pressure for the air within the baking plant where the oven 10 is situated.

Other variations are possible within the principles of this invention. For example, the control circuit 154 can use digital controls to advantage. Also, if desired, the pilot tube 52 or 152 can be disposed upstream of the dampers 46 or 146.

While the invention has been described in terms of certain preferred embodiments, it is to be understood that the invention is not limited to those embodiments, and that many variations and modifications thereof would become apparent to persons skilled in the art without departure from the scope and spirit of this invention as defined in the appended claims.

We claim:

1. An improved baking oven of the type in which oven enclosure means including a side enclosure and a roof define a baking space, means within said oven enclosure means to carry bakery goods into said baking space to be baked therein and to carry the baked goods out from said oven enclosure means, heating means within said oven enclosure means for heating the air in said baking space for baking the bakery goods, and an air exhaust duct having a mouth communicating with said baking space for conveying exhaust air from near the roof of said oven enclosure means to an exhaust stack venting to the atmosphere, means connected to said exhaust duct for forcing a draft of exhaust air therethrough and including a fan for forcing a draft of exhaust air through said duct; the improvement wherein said exhaust duct further includes exhaust air regulating means operatively disposed between the mouth of said duct and said fan for ensuring a constant mass flow rate of said exhaust air through said exhaust duct, notwithstanding changes in temperature and pressure in the ambient air and not withstanding wind action on said exhaust stack, said exhaust air regulating means including an exhaust damper within said duct and movable between open and closed positions to regulate air flow in said duct, mass flow rate sensing means disposed in said duct and providing a signal representative of said air mass flow rate, and damper control means having an input coupled to said mass flow rate sensing means and a control linkage coupled to said damper for controlling the movement of said damper in accordance with the air mass flow rate as sensed by said mass flow rate sensing means.

2. An improved baking oven according to claim 1, wherein said damper control means includes a modulating motor having an output shaft connected to said damper and an input, and drive circuit means having differential pressure inputs coupled to said pitot tube and an output providing current to said motor proportional to the mass flow rate sensed by said pitot tube.

3. An improved baking oven according to claim 1, wherein said mass flow rate sensing means is disposed downstream of said exhaust damper.

4. An improved baking oven according to claim 3, wherein said mass flow rate sensing means is disposed sufficiently beyond said exhaust damper to escape turbulence in the air flowing therepast.

5. In a baking oven of the type in which oven enclosure means including a side enclosure and a roof define a baking space, means within said oven enclosure means to carry bakery goods into said baking space to be baked therein and to carry the baked goods out from said oven enclosure means, heating means within said oven enclosure means for heating the air in said baking space for baking the bakery goods, and an air exhaust duct having a mouth communicating with said baking space for conveying exhaust air from near the roof of said oven enclosure means to an exhaust stack and thence to the atmosphere; the improvement wherein said exhaust duct includes exhaust air regulating means for ensuing a constant mass flow rate of said exhaust air through said exhaust duct, wherein said exhaust duct has an exhaust fan mounted thereon for forcing a draft through said duct to said stack, exhaust damper means in said exhaust duct between its mouth and the exhaust fan, mass rate flow sensing means disposed in said duct, and damper control means coupled to said mass rate flow sensing means and having a control linkage coupled to said exhaust damper means for controlling movement of the latter in accordance with the air mass flow rate as sensed by said mass flow rate sensing means, and wherein said mass flow rate sensing means includes a pitot tube extending into said exhaust duct and providing a low pressure output and a high pressure output, and said control means includes means coupled to said pitot tube to control said exhaust damper in accordance with the pressure difference between said high pressure output and said low pressure output.

6. An improved baking over according to claim 5, further comprising a differential pressure gauge having inputs coupled to the high pressure output and the low pressure output of said pitot tube, said gauge displaying an indication proportional to the air mass flow rate in said exhaust duct.

7. An improved baking oven according to claim 5, wherein said damper control means includes a pneumatic drive coupled to said exhaust damper and having a control pressure input, a supply arrangement for supplying compressed air, and a static pressure regulator having a supply input coupled to said supply circuit, an output coupled to the control pressure input of said pneumatic drive, and a pair of control inputs respectively coupled to the high pressure output and to the low pressure output of said pitot tube.

8. An improved baking oven according to claim 6, wherein said supply arrangement includes a cutoff valve in advance of said static pressure regulator for cutting off said compressed air during an oven purge cycle so that said damper is fully opened.

9. An improved baking oven according to claim 5, wherein said damper control means includes cutout means for optionally holding said damper means open, so that said damper means remains fully open during a large cycle notwithstanding variations in mass flow rate in said duct.

* * * * *